United States Patent [19]
Bettencourt et al.

[11] 3,986,561
[45] Oct. 19, 1976

[54] TOMATO HARVESTER

[75] Inventors: Thomas S. Bettencourt, Isleton; Lowell K. Marshall, Sacramento, both of Calif.

[73] Assignee: The Regents of the University of California, Berkeley, Calif.

[22] Filed: Aug. 7, 1974

[21] Appl. No.: 495,530

[52] U.S. Cl. .............................. 171/14; 130/30 R; 56/327 R; 171/27
[51] Int. Cl.[2] .................. A01D 55/02; A01D 45/00
[58] Field of Search ............... 56/327 R; 171/14, 27, 171/94, 101; 130/30 R

[56] References Cited
UNITED STATES PATENTS

| | | | |
|---|---|---|---|
| 3,199,604 | 8/1965 | Lorenzen et al. | 171/27 |
| 3,252,464 | 5/1966 | Hill et al. | 130/30 R |
| 3,455,453 | 7/1969 | Hill | 171/27 X |
| 3,473,613 | 10/1969 | Boyce | 171/14 |
| 3,613,796 | 10/1971 | Clayton et al. | 171/27 |
| 3,656,488 | 4/1972 | Dumanowski | 130/30 R |

*Primary Examiner*—Russell R. Kinsey
*Attorney, Agent, or Firm*—Owen, Wickersham & Erickson

[57] ABSTRACT

An improved tomato harvester severs tomato plants just below the ground and picks up the plants. Dirt clods, along with some loose tomatoes, are mechanically separated from the plants, and the plants are thereupon subjected to increasingly vigorous shaking by walking bars having plural upstanding resilient inverted vee projections to remove the tomatoes. The tomatoes are freed of chaff, twigs and other foreign matter and are then carried on a pair of main sorting conveyors past sorters who remove culls. At the same time the clods and loose tomatoes pass countercurrently by the same sorters, some of whom select the good loose tomatoes and place them onto the main sorting conveyor while the loose culls and clods are conveyed to the ground for disposal.

17 Claims, 27 Drawing Figures

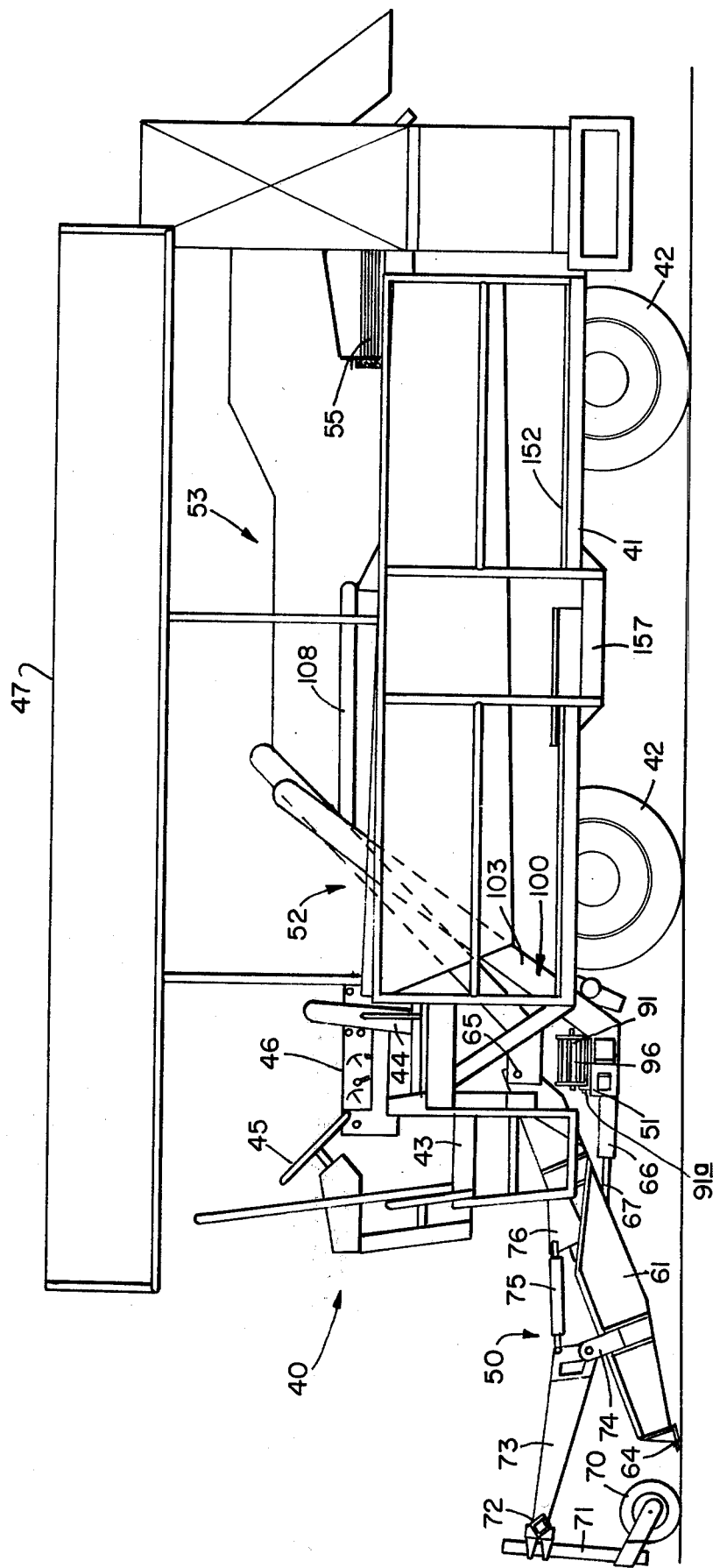

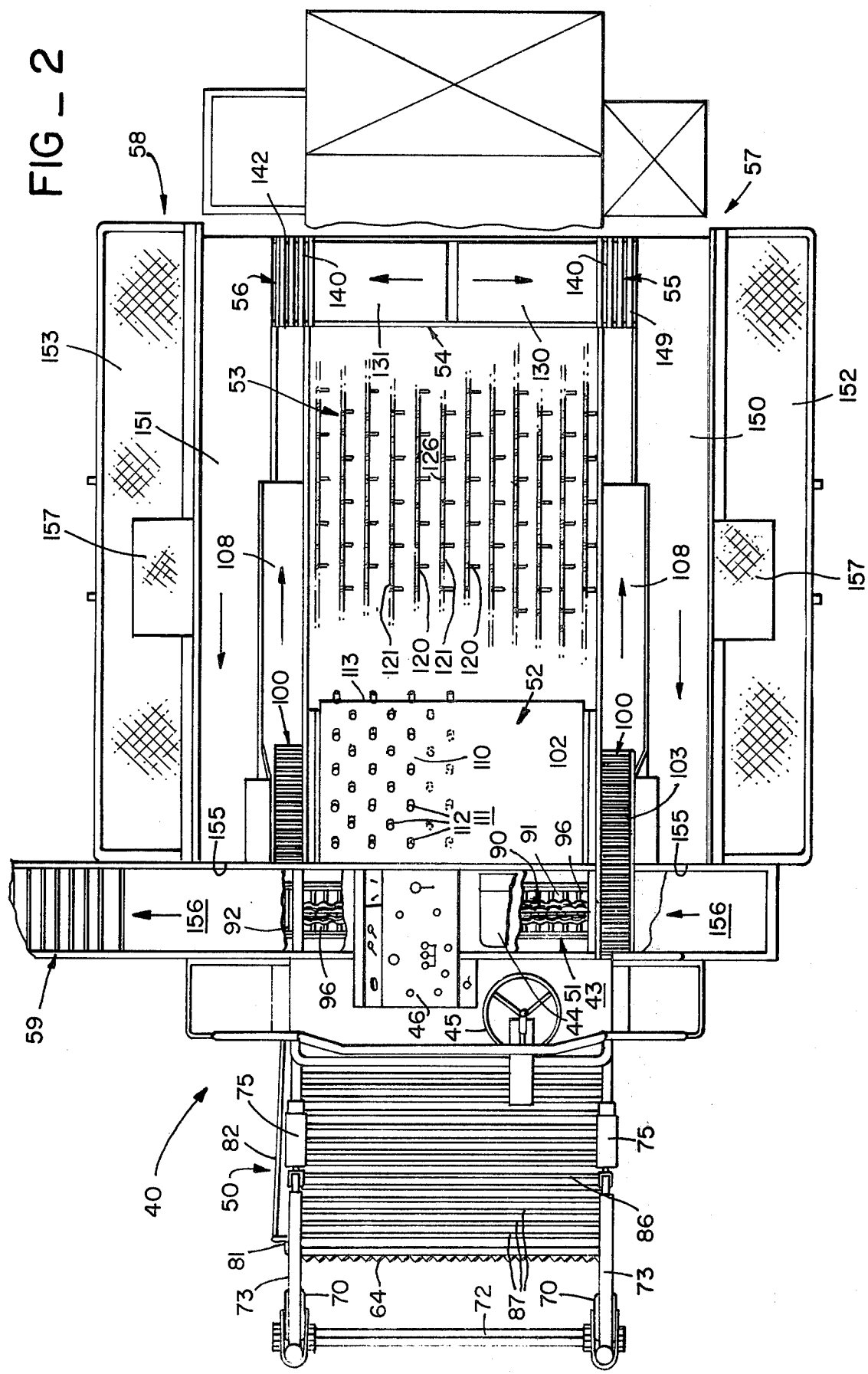

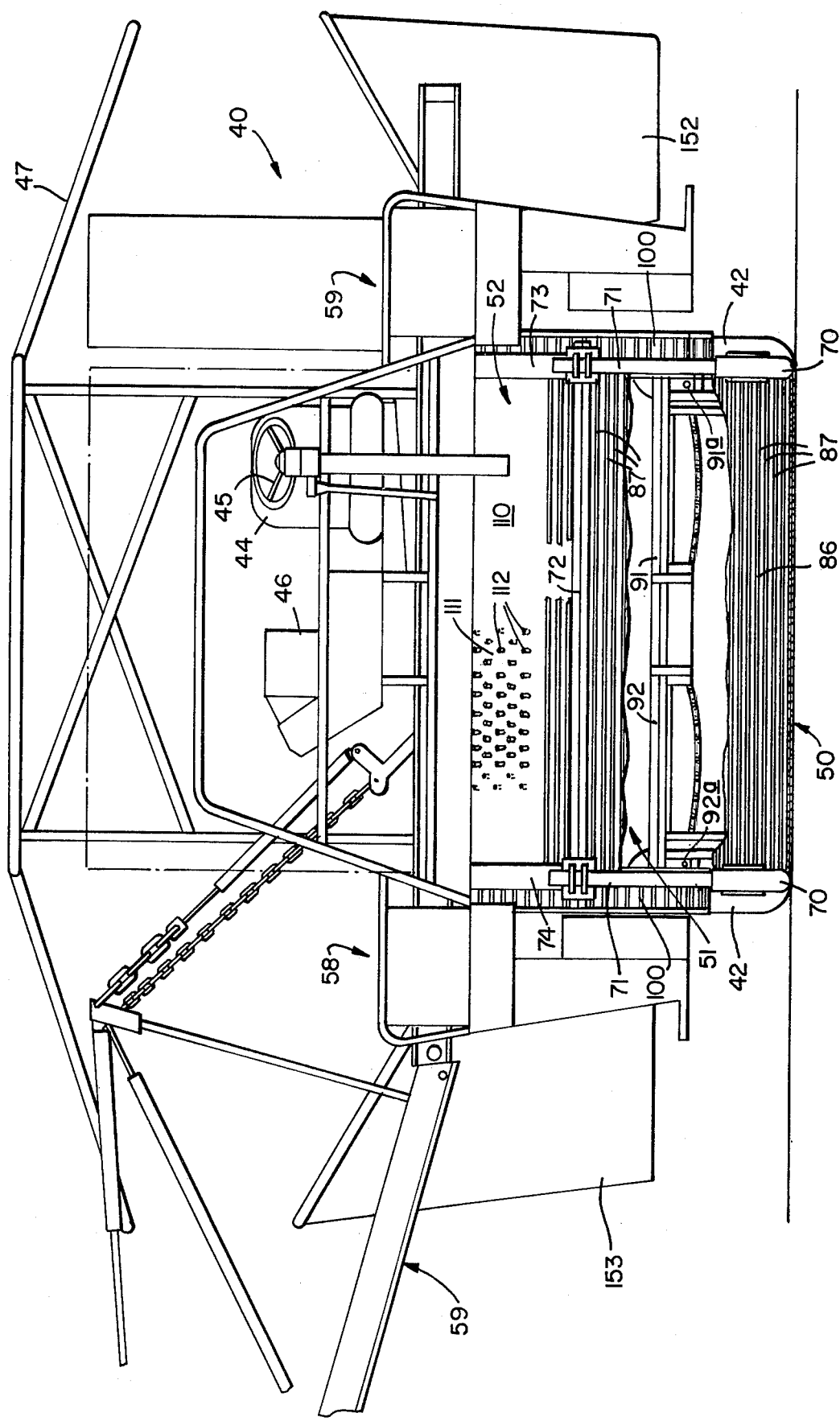

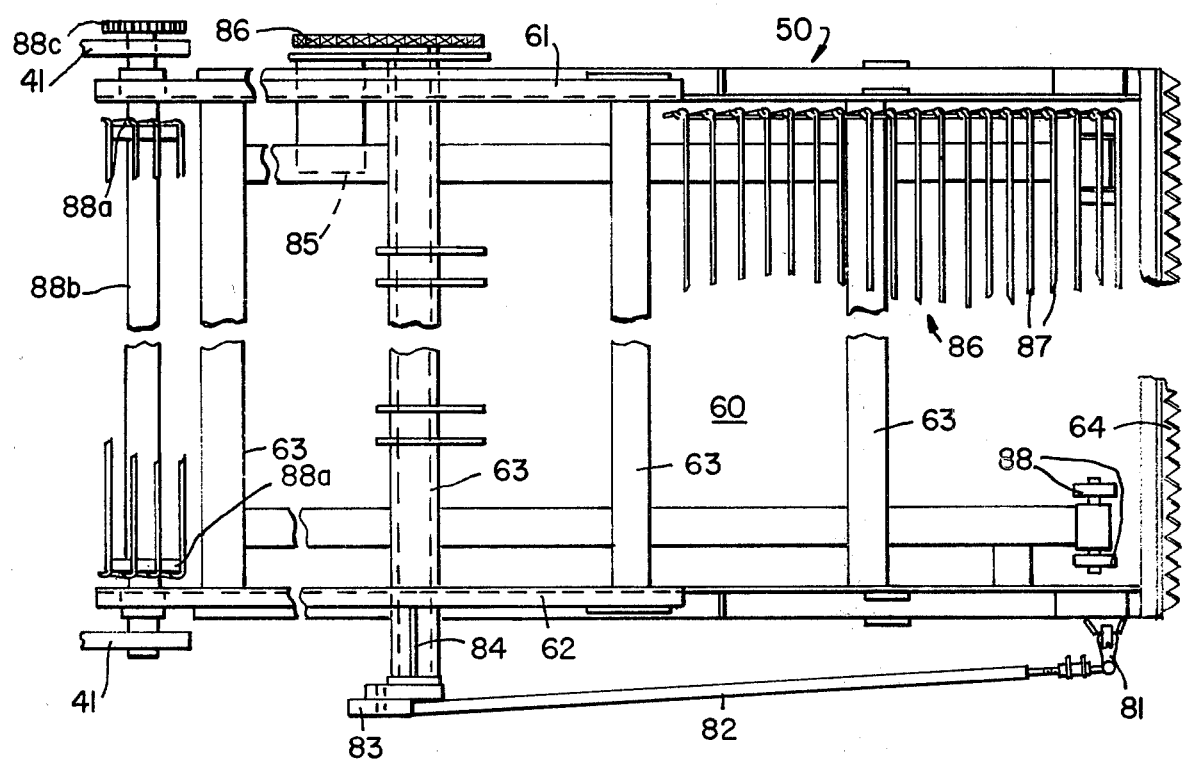
FIG_4
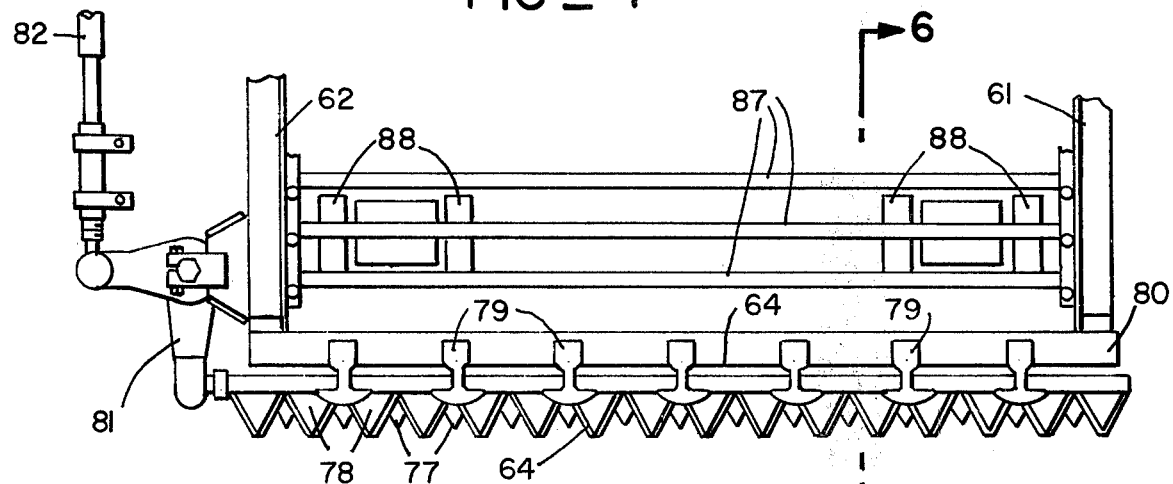
FIG_5
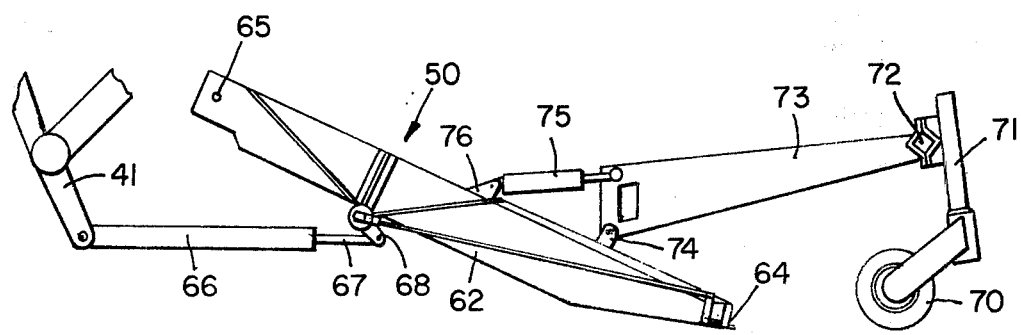
FIG_7

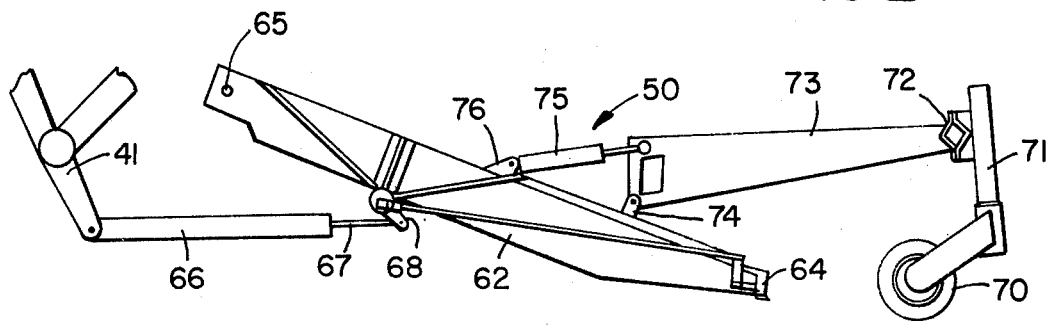
FIG_8
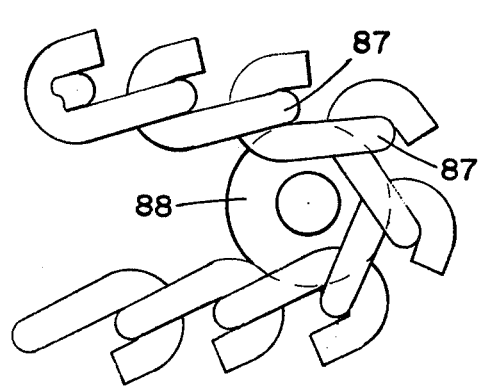
FIG_10
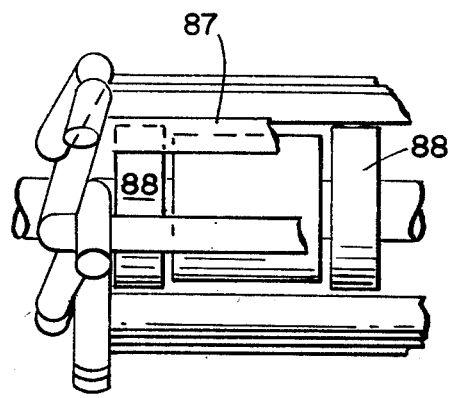
FIG_9
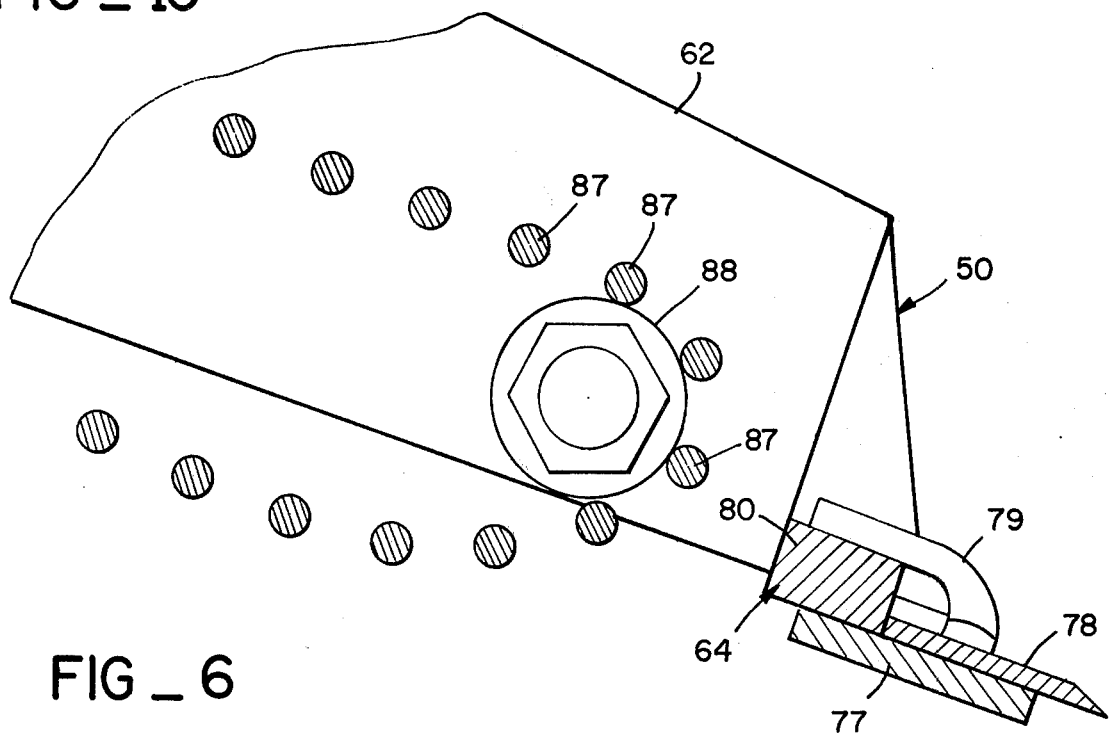
FIG_6

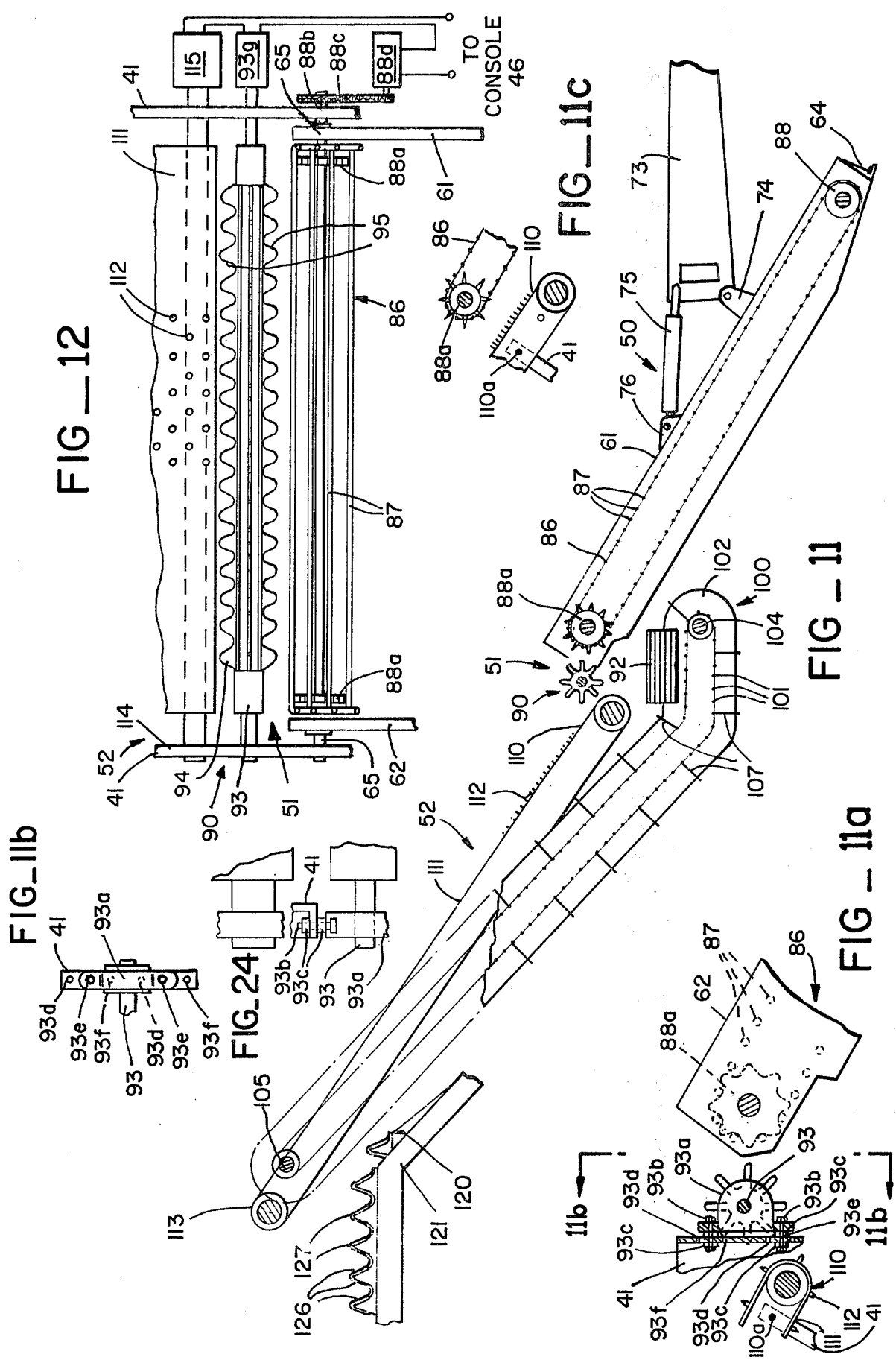

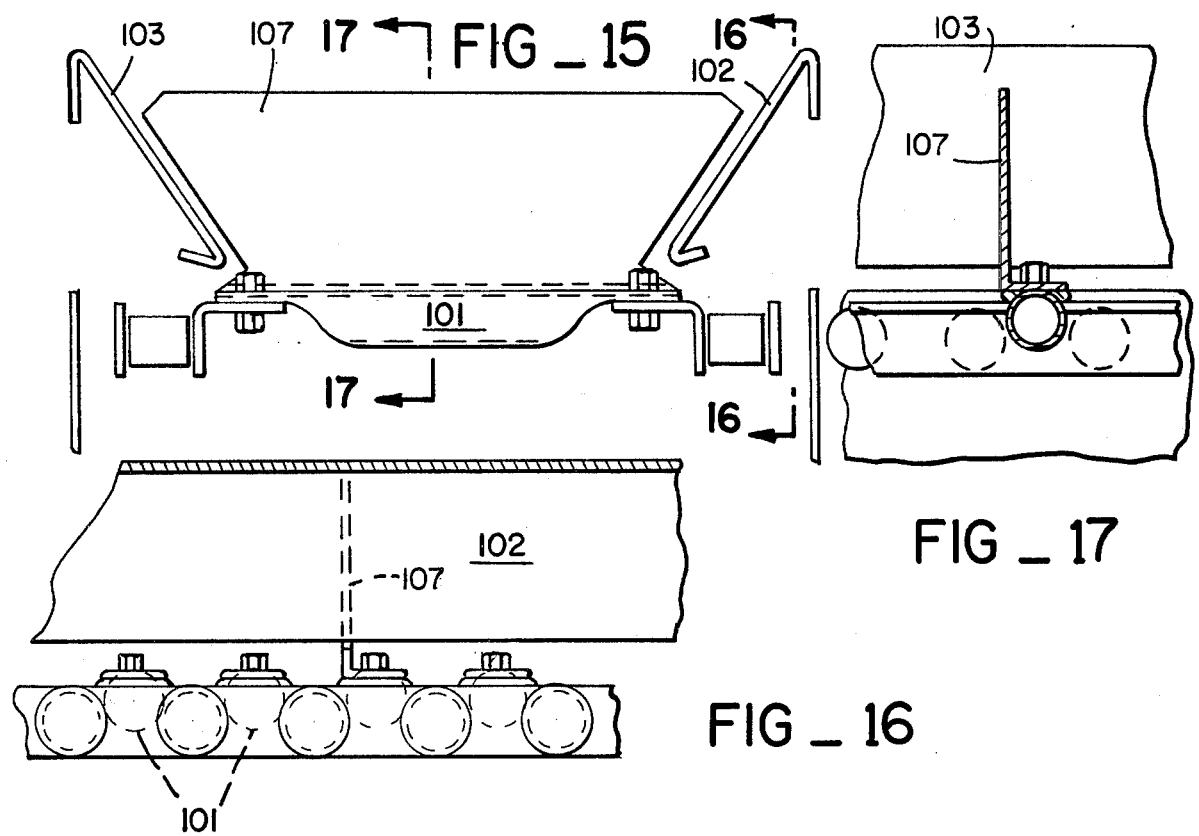
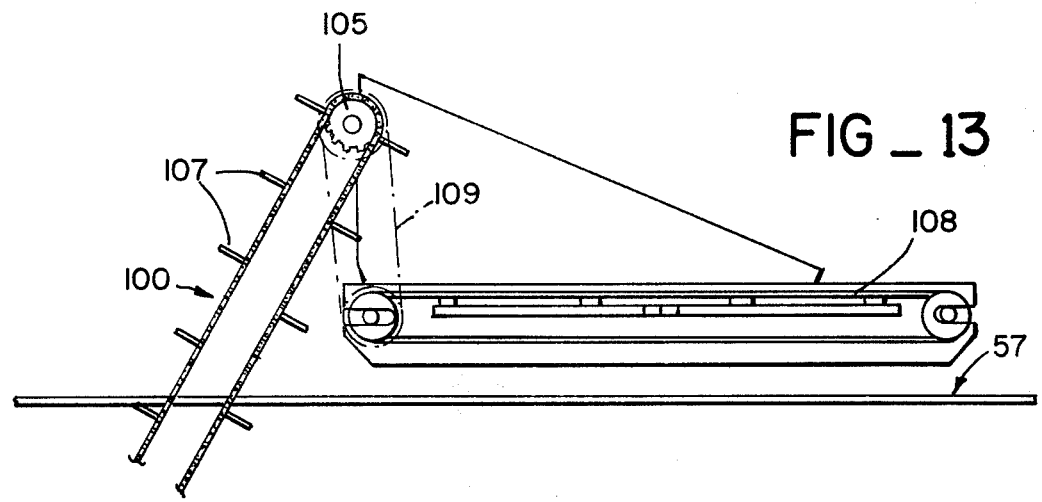
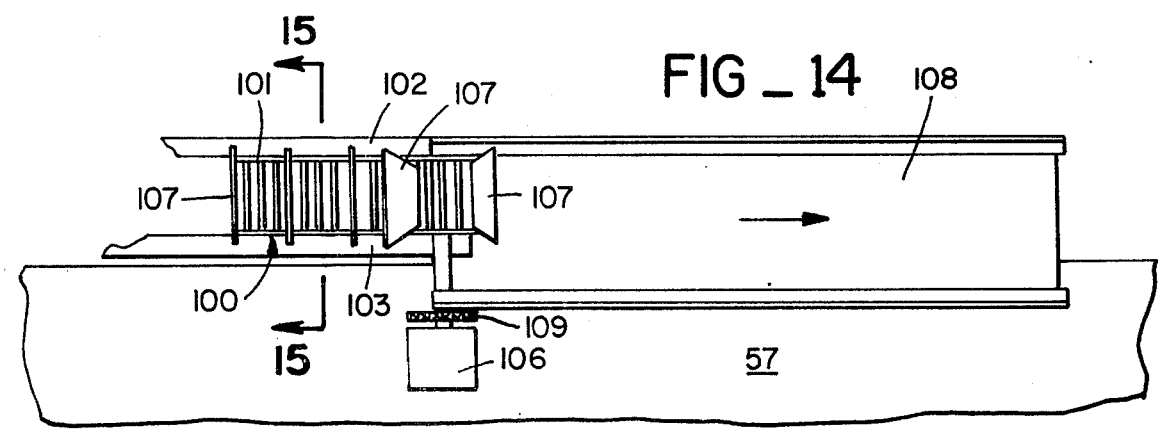

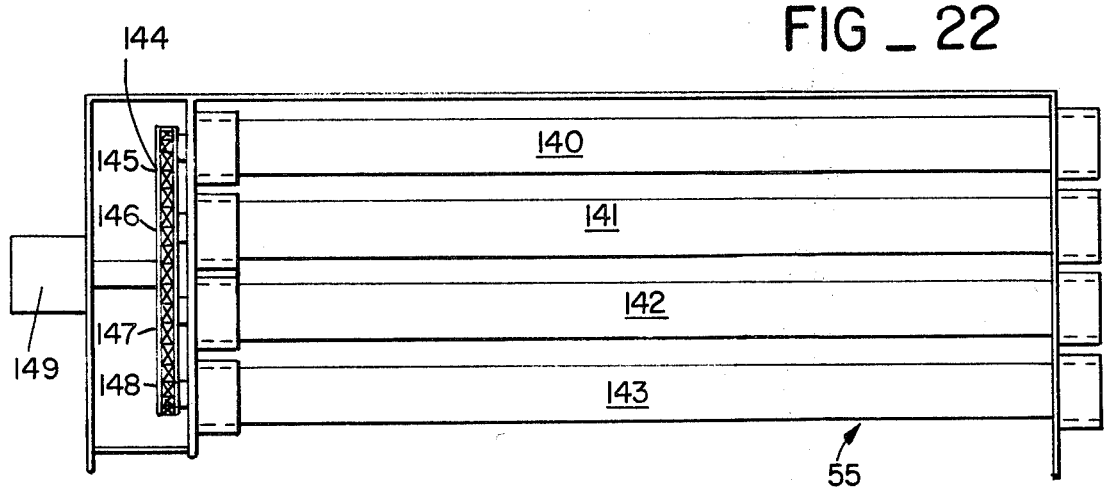
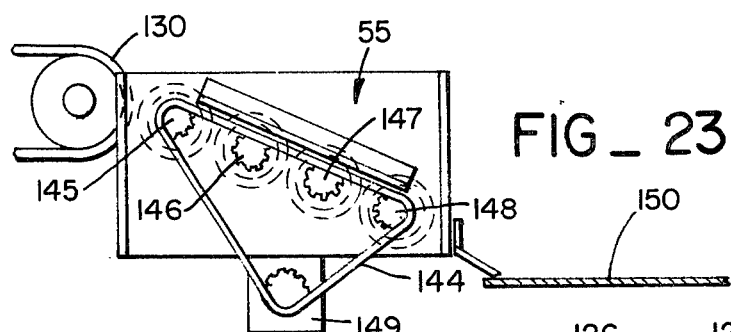
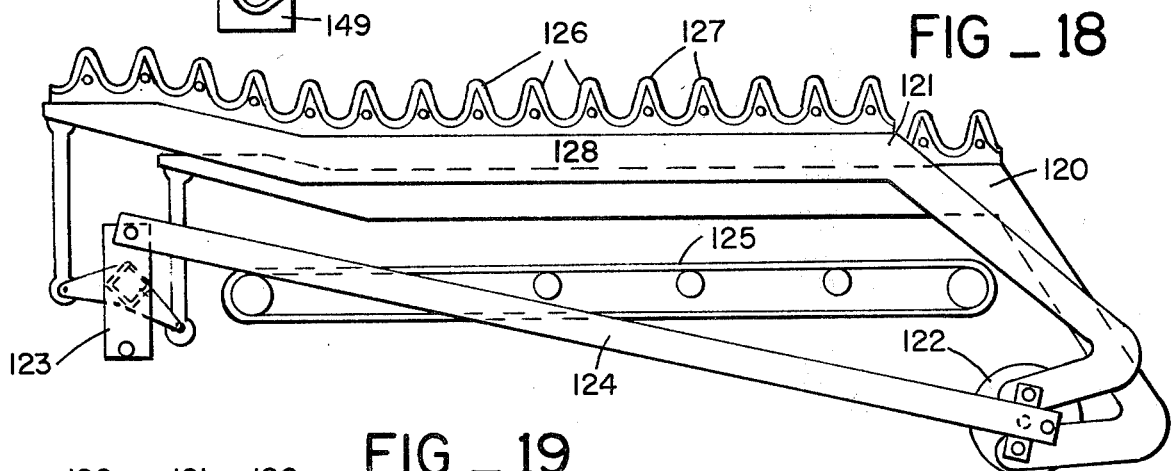
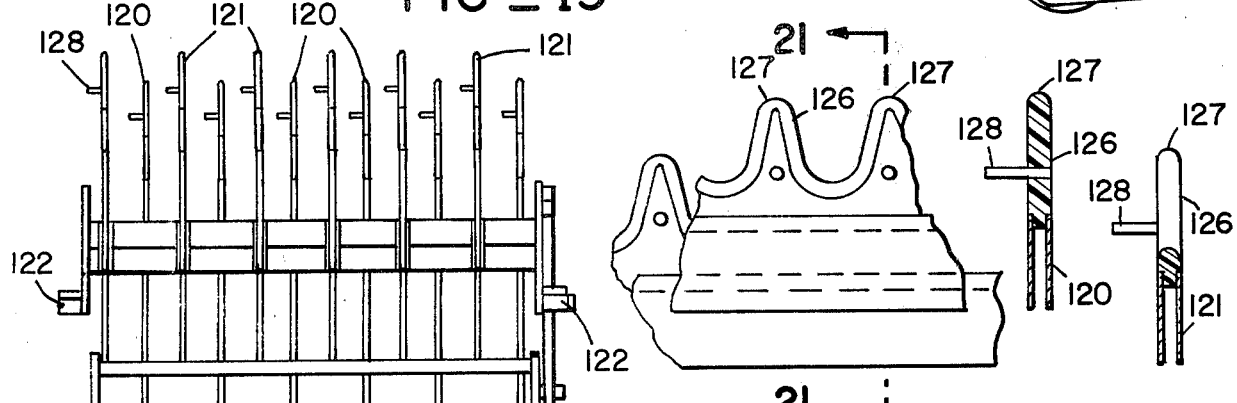

TOMATO HARVESTER

BACKGROUND OF THE INVENTION

This invention relates to an improved tomato harvester and to an improved tomato harvesting method.

Great savings for the public have resulted by the use of mechanical harvesting of tomatoes, the tomatoes used for canning at least. This has enabled fewer people to do more work and to do it better and when used in conjunction with the tomatoes especially bred for uniform ripening gives a large recovery from the field, so that the farmer has prospered as well.

However, mechanical harvesting has not been without problems. One of these has related to the pickup of dirt along with the tomato plants. Getting rid of these dirt clods has caused problems, since some farmers pick up so much dirt that it has become difficult for the sorters to separate the tomatoes from the dirt. The farmers do not want simply to discard the clods, since this would result in discarding loose tomatoes of about the same size as the clods. The present invention provides a good way of getting rid not only of fine dirt but also of clods substantially the size of tomatoes or even larger while still recovering loose tomatoes.

Some growers have also been dissatisfied with the recovery of tomatoes from the plants, saying that the shaking devices heretofore in use have not shaken off a sufficient number of tomatoes. The present invention is also directed to that problem and provides for an increased vigor of shaking to obtain more tomatoes from the plants.

The invention is also directed to numerous smaller problems which will appear in the course of discussion. Generally, it is an object of the invention to provide an improved tomato harvester directed particularly to improved recovery in the amount of tomatoes while still handling them with the requisite tenderness so that they are not damaged. It also has as its object improving the ease of sorting while still optimizing these recoveries. Other objects include solving the problems which such attempts at improved recovery result in, such a vastly improved mechanical separation of dirt and plant vegetation from the tomatoes.

SUMMARY OF THE INVENTION

The tomato harvester of this invention incorporates a cutter bar at the front end which severs the tomato plants below ground and is followed by a pickup device for lifting the plants. The pickup device includes an endless conveyor of linked, spaced-apart bars located to the rear of the cutter bar and spaced rearwardly from it a distance just sufficient to enable returning to the ground most of the dirt raised in a ground swell over the cutter bar, while being sure to lift the plants. This forward pickup section lies at a relatively low horizontal angle such as 20°, so as to increase recovery at this point, and a feature of this invention is that the rearward and upward movement of the pickup conveyor is slower than the ground speed of the harvester, about fifteen percent slower. During elevation, most of the remaining fine dirt and small chunks of dirt fall between the bars of the pickup conveyor, while the bars carry up the tomato plants along with clods of dirt and some tomatoes that fall off the plants during elevation or cutting or fall off prior to cutting.

The pickup device of this invention is made up of two separate sections—the forward pickup section just described, and an upper elevator section which is separated from the forward pickup section by a gap into which the clods fall, along with many of the loose tomatoes. Below the gap the clods (and loose tomatoes) fall onto a pair of cross-conveyors, and they are sent up to the sorting areas by a pair of special conveyor systems. In this gap the invention employs a rotating spinner bar which urges the tomato plants onto the upper elevator section while enabling the loose tomatoes and clods to fall onto their recovery system cross-conveyor. The spinner bar is constructed of undulating resilient fingers to accomplish this separation of the tomato plants from the clods and loose tomatoes at minimum damage to the plants themselves and simultaneously to prevent too many tomatoes from being shaken off during this elevating procedure, although such as are will be recovered at this point. A feature of this invention is that the spinner bar moves faster than the forward pickup conveyor, about fifteen percent faster, and therefore at a speed approximately equal to the ground speed of the harvester.

The upper elevator lies at a steeper angle of inclination than the forward pickup conveyor, so that the machine may be shorter than otherwise and so that the tomato plants are elevated directly to the shaker assembly. This upper elevator also moves faster than either the lower or forward pickup conveyor and the spinner, preferably about 15 percent faster than the spinner and therefore about 15 percent faster than the ground speed of the harvester. One need not be overly concerned at this stage with retaining the loose tomatoes on the upper elevator, for if any do become loose during this phase or have been carried up, they can still fall back down to the separator gap or else they become enmeshed with the plants enough to be carried up and recovered with the other tomatoes in the shaker assembly of the device. The upper elevator can therefore be an inperforate belt containing transverse flexible projections in sufficient numbers to engage the tomato plants and help to carry them up.

The velocities of the forward pickup section, the spinner bar, and the upper elevator are critically related to harvester ground speed and field conditions and are therefore adjustable by the operator. As noted above, under normal field conditions the forward pickup section operates in a rearward and upward direction at about fifteen percent below harvester ground speed, while the spinner bar rotates at about ground speed and the upper elevator travels at about 15 percent above ground speed.

The width of the gap—or even its very presence—may be varied so that differing field conditions are readily and easily accommodated. Where larger dirt clods are encountered, the gap is widened and where small clods are typical, the gap is narrowed. Where the soil is sandy and there are no clods, the gap may be closed. The gap width is varied by adjustment of the position of the spinner bar, and in this regard the spinner bar is preferably provided with three vertical and three horizontal positions. For complete removal of the gap, the spinner bar is removed and the upper elevator moved down.

At its upper end, the elevator deposits the plants in the shaker assembly of the harvester. This is similar to shakers shown in other harvester patents owned by this assignee, but has an important improvement in that it provides for a more vigorous shaking action for the tomato plants. To do this the shaker is provided with a series of upstanding inverted vee-shaped relsilient members, each having a rather acute angle of inclination, although the vertex thereof is rounded to prevent actual piercing of tomatoes. In addition, horizontal rubber fingers project transversely from the base of each inverted vee member. The inverted vee members and horizontally projecting fingers are mounted on movable walking bars. It has been found that when the walking bars are made to move back and forth as well as up and down in a circular path, the vee members and the horizontal fingers engage the vines and obtain a very vigorous shaking action which optimizes recovery of tomatoes. The speed of the shaker assembly may be varied to accommodate different tomato varieties.

The tomatoes recovered in the shaker are dropped onto a collector conveyor of linked bars, which may be substantially like that heretofore in use, and are thereupon moved to the rear and slightly upward for deposit onto cross-conveyors. The tomato plants after having been stripped are carried by the walking bars beyond the shaker and deposited at the rear of the machine on the ground. The cross-conveyors transport approximately half the tomatoes to one side of the device and half the tomatoes to the other side, whereupon the present invention provides for a downward slope and for a plurality of parallel rotating cylinders over which the tomatoes are carried, agaon causing waste, chaff, and any entangled dirt, to be freed from the recovered tomatoes before they pass onto sorting conveyors which carry the tomatoes along both sides of the device in a frontward direction.

Sorters standing along the side of each sorting conveyor discard damaged tomatoes, underripe tomatoes, and culls, as well as any foreign matter which may have managed to get beyond the separating devices already used. The sorting stations of this harvester differ from those of previous harvesters by the presence of an upper sorting conveyor carrying the clods and such tomatoes as are collected at the gap between the two sections of the pickup deviCe. One sorter may be located in each sorting line in a special position closer in and higher, so that he can reach over to the upper sorting conveyor where the tomatoes and clods recovered by the clod conveyor are moving rearwardly, countercurrently to the mainstream of recovered tomatoes, and he lifts the good tomatoes from the clod conveyor and puts them on the main sorting conveyor to send them in the forward direction, leaving bad tomatoes and dirt clods on this upper or clod conveyor, from the end of which they eventually fall off to the ground.

From here on, the operation is substantially like that used heretofore, with the main sorting conveyors depositing the chosen tomatoes on another cross-conveyor which sends them out to a discharge elevator on one side of the harvester and deposits them in a suitable container for carrying them to the cannery or other distribution point.

Other objects and advantages of the invention will appear from the following description of a preferred embodiment.

BRIEF DESCRIPTION OF THE DRAWINGS

In the drawings:

FIG. 1 is a view in side elevation of a tomato harvester embodying the principles of the invention.

FIG. 2 is a top plan view of the harvester of FIG. 1 with the canopy and canopy support frame omitted and with some portions broken away above the gap in the two sections of the pickup and elevator to show the spinner wheel at the gap and conveyor below it, and with the side conveyor and associated parts broken off.

FIG. 3 is a view in front elevation of the harvester of FIGS. 1 and 2 with the side conveyor and associated parts broken off. Also, the pickup conveyor is broken away to show the clod cross-conveyors, and some other parts are omitted.

FIG. 4 is a top plan view of the forward pickup assembly, the view being broken widthwise in order to conserve space.

FIG. 5 is an enlarged top plan view of the cutter bar and the front portion of the forward pickup assembly.

FIG. 6 is an enlarged sectional view of the forward pickup assembly taken along line 6—6 in FIG. 5.

FIG. 7 is a simplified view in side elevation of the forward pickup assembly showing the assembly and the gauge wheel in operating position and showing in somewhat diagrammatic form the hydraulic lifting mechanism.

FIG. 8 is a view similar to FIG. 7 showing the forward part of the pickup device in a raised position relative to the gauge wheel.

FIG. 9 is an enlarged view in front elevation of a portion of the linked bar endless conveyor used on the forward part of the pickup device of FIG. 4.

FIG. 10 is a fragmentary view in side elevation of the very front portion of the linked bar endless conveyor of FIG. 9 showing one of the idlers around which the front end rotates.

FIG. 11 is a somewhat diagrammatic view in side elevation and section of the pickup assembly with the gauge wheel and a portion of the side elevator broken away.

FIG. 11a is an enlarged and somewhat diagrammatic view in side elevation of the spinner mounting journal with the lower portion thereof in section and with the frame mounting portion broken away to show the lower end of the upper elevator.

FIG. 11b is a fragmentary view in front elevation of the spinner mounting journal taken along line 11b—11b of FIG. 11a.

FIG. 11c is a fragmentary view of a portion of FIG. 11, with the spinner bar removed and the upper elevator moved down to eliminate the gap.

FIG. 12 is a top plan view of the clod separator including the gap and the spinner bar between the forward section and the upper elevator, with the frame and the side walls of the forward pickup assembly cut away and with the series of connected hydraulic power motors shown somewhat diagrammatically.

FIG. 13 is a simplified fragmentary view in side elevation, partly is section, of most of the elevator used for elevating the clods and loose tomatoes from a clod cross-conveyor leading out from the gap up to an auxiliary, rearwardly moving sorting conveyor and showing an initial part thereof.

FIG. 14 is a fragmentary top plan view of the same elements as FIG. 13.

FIG. 15 is an enlarged view in cross section taken along the line 15—15 in FIG. 14.

FIG. 16 is a view in section taken along the line 16—16 in FIG. 15.

FIG. 17 is a view taken along the line 17—17 in FIG. 15.

FIG. 18 is a simplified and somewhat diagrammatic view in side elevation of the shaker assembly, showing two of the walker bars and their connections to the rotational and translational elements and their suspensions and also showing therebeneath a portion of the collecting conveyor. The assembly is shown horizontal although actually it is tilted at an angle in use, this being done to save drawing space.

FIG. 19 is a view in rear elevation of the shaker assembly.

FIG. 20 is an enlarged fragmentary detailed view in side elevation of a portion of two adjacent parallel bars.

FIG. 21 is a view in elevation and in section taken at right angles to FIG. 20 along line 21—21.

FIG. 22 is a top plan view, on a enlarged scale, of the roller system which conveys the collected tomatoes from the cross-conveyor in FIG. 2 to the sorting conveyors.

FIG. 23 is a view in side elevation and on a reduced scale of the device of FIG. 22.

FIG. 24 is a detailed view of a portion of device shown in FIG. 12.

DESCRIPTION OF A PREFERRED EMBODIMENT

General overall description (FIGS. 1–3):

A tomato harvester 40 embodying the principles of this invention is illustrated in the drawings; although, of course, other embodiments are possible. In the device shown in FIGS. 1, 2, and 3, there is a main frame 41 supported on wheels 42. The harvester 40 has a suitable self-driving mechanism, such as an internal combustion engine, and appropriate drive apparatus, such as a transmission and differential. The main frame 41 incorporates a driver's platform 43 and a seat 44, and the driver is provided with a steering wheel 45 and a control console 46 containing suitable controls to regulate and monitor the operating parameters of the harvester 40. A canopy 47 is mounted on the main frame 41 and shades the entire harvester; it may be essentially that which is described in U.S. Pat. No. 3,455,311. The main frame 41 also carries all of the subsidiary parts of this harvester. As shown in the drawings, these subsidiary parts include a forward pickup assembly 50, a loose tomato and clod separator 51, an upper elevator 52, a shaker assembly 53, a rear cross-conveyor and chaff removal assembly 54, two transition conveyors 55 and 56, two tomato sorting lines 57 and 58, and a discharge elevator and tomato loading assembly 59.

The forward pickup assembly 50 (FIGS. 1–11):

As shown in FIGS. 1–4 the forward pickup assembly 50 has a rectangular frame 60 with two sidewalls 61 and 62 and a series of spaced cross members 63. A cutter bar 64 is supported at the front end of the assembly 50. The assembly 50 is pivotally mounted at its rear end to the main frame 41 by pivot members 65. A pair of lower hydraulic cylinders 66 are each pivotally mounted to the main frame 41 and rods 67 from their pistons are pivotally secured to crank arms 68 that are supported by a lower portion of the sidewalls 61 and 62, so that the front end with the cutter bar 64 may be raised and lowered relative to the main frame 41.

As shown in FIGS. 1–3, 7, and 8, a pair of casters or gauge wheels 70 extend forward of the cutter bar 64. These wheels 70 are each secured to a generally vertical rod 71 and the rods 71 are secured to a framework comprising a cross member 72 and a pair of arms 73 that are pivotally secured to extension members 74 mounted to the upper edge of the sidewalls 61 and 62. A pair of hydraulically activated driving cylinders 75 are each pivotally mounted between an arm 73 and a bracket 76 fixed to the top edge of the sidewalls 61 and 62 to the rear of the extension member 74. By this mechanism, the gauge wheels 70 may be raised and lowered relative to the forward pickup assembly 50.

As shown in FIGS. 5 and 6, the cutter bar 64 includes the combination of a fixed lower blade 77 with multiple vee-shaped serrations therein and a slidable upper blade 78 with multiple vee-shaped serrations therein, corresponding to the serrations of, and mounted on top of, the lower blade 77. In FIGS. 5 and 6 plural hold down guides 79 mounted on cutter bar beam 80 urge the upper blade 78 in contact with the lower blade 77 and against and hold the lower blade 77 the cutter bar beam 80. The upper blade 78 is connected to a rocker arm 81 journalled to the front of the sidewall 62 as viewed in FIGS. 4 and 5. The rocker arm 81 (See FIG. 4) is connected to one end of a connecting rod 82 which is connected at its other end to a crank 83 which is in turn connected to one end of a crankshaft 84 journalled through the sidewalls 61 and 62 and connected at its other end to a hydraulic motor 85 via a chain drive 86, to provide a three-inch travel of the upper blade 78 at a typical rate of 150 cycles per minute, with 300 cycles per minute being maximum.

Contained within the forward pickup assembly 50 and beginning about an inch and a half behind the cutter bar beam 80 is a continuous pickup connveyor 86 of end-linked spaced-apart rods 87. The bars 87 are spaced apart to let dirt fall through between them, but they have to be close enough to each other so that the tomatoes being harvested do not fall through. As a result of this requirement, some colds which are as large as tomatoes are necessarily picked up and elevated along with the plants and loose tomatoes. It is believed that most of the loose tomatoes carried up by the conveyor 86 are those which fall off the plant during cutting of the plant stem or which fall off thereafter. Some of them, however, have probably fallen off previously, and most of these are liable not to be good tomatoes.

The conveyor 86 is guided by the interior surfaces of the sidewalls 61 and 62. Plural idler wheels 88 guide the rods 87 just inside the endlinks to provide a low profile at the front end of the conveyor 86.

The conveyor 86 is passed around plural sprocket wheels 88a at its rearward upper end. The sprocket wheels 88a engage the rods 87 to move the top surface of the conveyor 86 rearwardly and upwardly at a controllable rate. The wheels 88a are secured to a drive shaft 88b which is journalled through both sidewalls 61 and 62 of the forward pickup assembly 50 and also through the main frame 41 adjacently to the sidewalls thereby providing a pivot point 65 of the forward pickup assembly 50 to the main frame 41. One end of the shaft 88b is connected via a sprocket and chain drive assembly 88c to a hydraulic motor 88d, which provides the drive power for the pickup conveyor 86.

It has been found that pickup of the severed tomato plants and loose tomatoes is enhanced by running the pickup conveyor 86 slower than the ground speed of the harvester 40 as a whole. Thus, for generally obtaining tomato field conditions, optimum performance of the forward pickup assembly 50 results when the rearward movement of the top surface of the pickup conveyor 86 is approximately fifteen percent slower than the ground speed of the harvester 41.

The rearward spacing of the front end of the pickup conveyor 86 from the cutter bar beam 80 is very important. The purpose here is to enable the ground swell created by the action of the cutter bar 64 to pass over the cutter bar beam 80 and fall back to the ground before the conveyor 86 reaches it and to impede any pickup of loose dirt by the conveyor 86. Thus, most of the dirt loosened by the cutter 64 passes beneath even the low profile of the pickup conveyor 86 and is not picked up thereby, for when harvesting devices pick up a layer of loose dirt (and no attempt is made to do so in the present invention), there are resultant gross quantities of dirt to process and dispose of. A space of about one and a half inches between the cutter bar beam 80 and the conveyor 86 has proven to be sufficient to minimize loose dirt pickup and still pick up everything desired.

Moreover, by having the conveyor 86 move rearwardly and upwardly at a speed about fifteen percent less than the harvester's ground speed (the actual speed being carefully controlled by the operator according to obtaining harvesting conditions), the material is crowded onto the lower pickup conveyor 86, and this arrangement appears to improve the recovery obrained from the field.

The loose tomato and clod sepatator 51 (FIGS. 1–4 and 11–17):

The loose tomato and clod separator 51 is located in a gap between the upper end of the pickup conveyor 86 and the lower end of the upper elevator 52. It includes a spinner 90 and two in-line cross-conveyors 91 and 92 therebelow, moving in opposite directions from center. The gap between the conveyor 86 and the spinner 90 is wide enough so that loose tomatoes and tomato sized dirt clods as well as smaller particles and objects fall down to the cross-conveyors 91 and 92, but is sufficiently narrow to prevent tomato plants from passing therethrough.

The spinner 90 comprises a shaft 93 carrying a plurality of radially outwardly extending bare 94 preferably made of a suitable elastomer and having a sinuous outer edge 95. Each end of the spinner shaft 93 is journaled through a bushing 93a which is bolted to the main frame 41 with two bolts 93b, which pass through the bushing 93a, spacers 93c and the main frame 41. As best shown in FIG. 11a the spacers 93c permit the spinner 90 to be field adjusted to one of three horizontal positions, depending upon the placement of the spacers relative to the bushing 93a and the main frame 41 namely, (1) one spacer 93c of each pair on each side of the frame 41, as shown in FIG. 11a, (2) both spacers 93c on the same side of the frame 41 as the heads of the bolts 93b and (3) both spacers 93c between the bushing 93a and the frame 41. Also, as best shown in FIG. 11b the spinner 90 may be set to one of three vertical positions by three sets of vertical holes 93d, e, and f, in the main frame, each set being aligned to receive the bolts 93b which secure the bushing 93a to the frame 41. The three vertical and three horizontal positions provide the farmer with a readily available way to vary the width of the gap to accommodate different varieties of tomatoes and differing field conditions.

One end of the spinner shaft 93 is coupled directly to a hydraulic motor 93g which rotates the spinner 90 so that its bars 94 move upwardly and rearwardly relative to the pickup conveyor 86 at a controllable rate. It has been found that transfer of the tomato plants over the gap between the conveyor 86 and the spinner 90 is optimized if the spinner 90 moves about fifteen percent faster than the pickup conveyor 86. The faster spinner speed lifts the plants onto the upper elevator assembly 52 with sufficient traction to prevent them from becoming entangled about or around the spinner 90. Also, the increase in speed has been found, by observation, to result in smoother movement of the plants, with less agitation. At the same time the sinuous edges 95 of the resilient spinner bars 94 pass the loose tomatoes and clods to the cross-conveyors 91 and 92 positioned below the gap.

The spinner bar 90 is made to be readily removable, not only for replacement but for harvesting where no gap is desired. As shown in FIGS. 11a and 11c, after the spinner bar 90 and the clod cross conveyors 91 and 92 have been removed, the upper elevator 110 can be slid down about ten inches and locked as by resetting a few bolts 110a, to place the elevator in an alternative position relative to the main frame 41 where the elevator's lower end underlies the upper end of the pickup conveyor 86. One situation to which this applies is where the soil is sandy and there are no clods and little loose fruit. Another situation calling for eliminating the gap is where there is so much loose fruit that it would overtax the sorter at the station when loose fruit must be transferred to the main sorting belt.

The cross-conveyors 91 and 92 are made up of endless spaced-apart end-linked bars 96 through which smaller bodies may pass, and they may be driven by sprocket wheels (not shown) linked to a hydraulic motor (also not shown). The cross-conveyors 91 and 92 are made to be easily removable from the harvester main frame 41, as by taking out a few bolts 91a and 92a as shown in FIGS. 1 and 3 and disconnecting them from their motors or removing the motors. Under conditions where there are many clods and little salvageable loose fruit, the clods and spoiled fruit then drop directly to the ground and thereby keep the machine cleaner. Removal is also convenient when the gap between the upper elevator 52 and the pickup 50 is to be eliminated, as described above.

Sloping up from a position below the outward end of each conveyor 91 and 92 and receiving the loose tomatoes and clods therefrom are side elevators 100 (FIGS. 11 and 13–17), each made up of an endless chain of spaced-apart end-linked bars 101 guided by elevator sidewalls 102 and 103 and engaged by sprocket wheels 104 and 105 at each end, one of which is rotated by a hydraulic motor 106. About every fifth linked bar 101 may have an inverted trapezoid-shaped elastomeric flight bar 107 fixed thereto and extending perpendicularly outward from the plane formed by the bars 101, as shown in FIGS. 16, 17, and 18.

The upper end of each side elevator 100 lies above an endless loose tomato and clod imperforate auxiliary sorting conveyor belt 108; this belt 108 is tended by one or more sorters, to remove tomatoes from the conveyor belts 108, letting the belts 108 carry away and dump the colds and damaged or underripe or overripe tomatoes. A chain linkage 109 (FIGS. 13 and 14) serves to connect the conveyor 108 to the elevator motor 106.

The upper elevator assembly 52 (FIGS. 1–3 and 11):

As best shown in FIGS. 2 and 11, 11a and 11b, the upper elevator assembly 52 begins just above the loose tomato and clod separator 51. The spinner 90 is parallel to and adjacent to the lower end of an upper elevator conveyor 110, which is preferably made from an endless imperforate belt 111 of a suitable plastic or synthetic rubber material having rows of elastomeric projections 112 thereon of sufficient length to engage the tomato plants that pass over the spinner 90. The upper end 113 of the upper elevator conveyor 110 is positioned over the forward end of the shaker assembly 53, so that the tomato plants carried upward by the conveyor 110 are deposited onto the shaker assembly 53.

While it is desirable to align the upper elevator assembly 52 as horizontally as possible, undue harvester length results therefrom. Consequently, it has been found that an angle of about forty-two degrees provides excellent engagement and elevation of the tomato plants and maintains the desired length of the harvester.

A cylindrical drum 114 engages the endless conveyor belt 111 adjacently to the spinner 90. The drum is journaled through the main frame 41 and is directly connected to a hydraulic motor 115 which rotates the drum at a controllable rate and moves the conveyor belt 111 upwardly.

As with the pickup conveyor 86 and the spinner 90 optimum elevator performance has been found when the upper elevator conveyor 111 travels upwardly at a speed approximately fifteen percent faster than the spinner 90. The speed differential causes the conveyor 111 and the projections 112 to pull the tomato plants off of the spinner 90 and lift them upwardly.

As shown in schematic form in FIG. 12, the forward pickup conveyor hydraulic motor 88d and the spinner hydraulic motor 93g and the upper elevator hydraulic motor 115 are all connected in series in a hydrostatic drive configuration controllable at the control console 46. The series interconnection of the three motors permits the operator to adjust the speed of the forward pickup conveyor 86 in accordance with harvester speed or field conditions while at the same time the speed ratios between the forward pickup conveyor 86, spinner 90 and upper elevator belt 111 are maintained the same.

The shaker assembly 53 (FIGS. 1, 2, and 19–22):

The shaker assembly 53 (See FIGS. 2 and 20) comprises a series of longitudinally extending walking bars arranged in two sets, the walking bars in one set being denoted by the reference numeral 120, and those in the other set being denoted by numeral 121. All the bars 120 and 121 lie in parallel planes, and the two sets move 180° apart in both up-and-down and fore-and-aft movement, preferably so that any one point on a bar 120 or 121 moves through a circle or ellipse. Except for an improvement disclosed hereinafter, the shaker assembly 53 is similar to that shown in the assignee's U.S. Pat. Nos. 3,252,464 and 3,455,453. Referring now to FIGS. 19 to 22, the bars 120 and 121, etc., are made to produce a walking action by a crank-shaft 122 driven by a variable speed power source (not shown) operating in the range of 175 to 195 rpm, depending upon field conditions and variety of tomato. Reciprocal power is transferred to a rear connection rocker arm assembly 123 via a connecting rod 124. A tomato recovery conveyor 125, which may be of an endless chain of spaced-apart end-linked parallel rods, is mounted underneath the walking bars 120 and 121, etc. The conveyor 125 may be essentially the same as that described in U.S. Pat. No. 3,206,011.

The shaker assembly 53, as seen in FIGS. 18, 20, and 21, has been improved in function over prior-art shakers by the addition of a plurality of regularly spaced-apart inverted vee projections 126. Each bar 120, 121 preferably has a series of such projections 126 extending vertically from it. These projections 126 extend upward at a sharp angle, preferably about 75°, and their upper ends 127 are rounded to prevent impaling of tomatoes; the projections 126 extend well into the tomato plants to impart a more vigorous agitation of the plants while still pulling them forward. The increased shaking action effectively frees the tomatoes from the plants. From near the base of each projection 126 a transverse horizontal finger 128 extends outwardly on one side of each bar 120, 121 nearly all the way across the gaps existing between each bar 120 and each adjacent bar 121. The principle of the fingers is essentially the same as that described in U.S. Pat. No. 3,455,453, although in this assembly 53 the fingers 128 may be either rigid or resilient.

The rear cross-conveyor and chaff removal assembly 54 (FIGS. 1 and 2):

In the harvester shown in FIG. 2 the rear cross-conveyor and chaff removal assembly 54 is made up of two conveyor belts 130 and 131, which are positioned to receive tomatoes from the collecting conveyor 125. The belts 130 and 131 move outwardly from the fore-and-aft centerline of the harvester 40 and away from each other. A blower (not shown) sends a stream of air across the belts 130 and 131 to carry chaff, leaves, twigs, dirt and trash, ect. The rear cross-conveyor and chaff removal assembly 54 is essentially the same as that described in U.S. Pat. No. 3,422,953 with improvements as described in U.S. Pat. No. 3,455,448.

The transition conveyors 55 and 56 (FIGS. 1, 2, 22 and 23):

The two transition conveyor assemblies 55 and 56 are identical to each other. Each one is preferably made up of a plurality of rotating cylinders, preferably four cylinders 140, 141, 142, and 143 mechanically linked by a chain drive assembly 144 and gears 145, 146, 147, and 148, respectively (FIG. 23), to rotate in the same direction at a fixed slow rate. They may be driven by a hydraulic motor 149. In each assembly 55, 56 the cylinders 140, 141, 142, and 143 are parallel and are spaced apart so that chaff and other foreign matter can fall between the cylinders 140, 141, 142, and 143 while the tomatoes are moved on to the sorting lines 57 and 58.

As shown in FIG. 23 the cylinders 140, 141, 142, and 143 are mounted to provide a path inclined downwardly, and, referring to FIG. 2, the assemblies 57 and 58 are positioned in the harvester 40 so that the highest cylinders 140 lie next to the rear cross-conveyor belts 130 and 131, and the lowest cylinders 143 lie next to the sorting lines 57 and 58. The downward inclination causes the tomatoes to roll down onto sorting conveyors 150 and 151 and, in conjunction with the rotation of the cylinders 140, 141, 142, and 143 produces a better distribution of the tomatoes on the sorting conveyors 150 and 151 than was obtained by fixed crowder rails ulitized in prior-art tomato harvesters. In addition, the transition conveyors provide further separation of any chaff and other foreign matter still present.

The tomato sorting lines 57 and 58 (FIGS. 1–3):

The tomato sorting lines 57 and 58 of the harvester 40 preferably employ two imperforate and continuous sorting conveyors 150 and 151, one positioned on each side of the main frame 41 and running horizontally in a forward direction. A sorter platform 152, 153 is positioned on each side of the harvester 40 to support sorter personnel who stand facing the sorting belts 150 and 151. An integral part of the sorting lines 57, 58 are the two auxiliary conveyor belts 108 for the loose tomatoes and clods. These belts 108 are positioned above and just behind the main sorting belts 150, 151.

A separate elevated and instepped clod conveyor sorter platform 157 is positioned on each side of the harvester 40 above the sorter platform 152, 153 and adjacent to the loose tomato and clod conveyor belt 108. The raised and instepped platform 157 positions one or two sorters closer to the clod conveyor 108 and enables the sorter to reach over the main sorting belt 150, 151 to the loose tomato and clod conveyor 108 so that good tomatoes are easily picked up from that conveyor 108 and placed onto the main conveyor 150, 151 therebelow. An inset railing 158 adjacent to the outer edge of the main sorting belt 150, 151 and above the clod conveyor sorter platform 157 supports the sorter as he or she leans over the main sorting belt 150, 151 to reach the clod conveyor 108.

In instances where the clod conveyor 108 is not used for conveying loose fruit and clods (e.g., where the gap is eliminated and the spinner bar 90 removed along with the clod cross-conveyors 91 and 92, or when the cross-conveyors 91 and 92 only are eliminated), the clod conveyor 108 is put to a somewhat different purpose: the sorters on the platforms 157 then remove culls from the main belts 150 and 151 and place the culls on the conveyor 108. This is done because there is no cull chute for these particular sorters, and it works quite well.

The forward ends 154, 155 of the main sorting belts 150, 151 terminate directly adjacent to a transverse conveyor 156, as shown in FIGS. 2 and 3. The transverse conveyor 156 employs conventional principles to convey all the chosen tomatoes to the tomato loading conveyor assembly 59.

SUMMARY OF OPERATION:

Summarizing the operation, the harvester 40 is self propelled along the ground on its wheels 42. The cutter bar blade 64, the walker bars 120, 121 the spinner 90, and the other conveyors and elevators are moved at predetermined constant speeds. As the harvester 40 moves along the rows, the forward pickup device 50 is lowered so that the cutter bar 64 cuts close to and usually below the ground. The forward pickup device 50 and the cutter bar 64 are guided and stabilized by the gauge wheels 70, which are adjusted to run in parallel adjacent furrrows straddling the row of tomatoes being harvested.

At the beginning of a row of tomato plants to be harvested, the operator lowers the forward pickup assembly 50 so that the cutter bar 64 penetrates the ground to a depth of about one inch. This adjustment is accomplished at the control console 46 by varying the position of the hydraulically activated drivers which set the gauge wheels 70 relative to the forward pickup assembly 50. The lower hydraulic cylinders 66 are set to move freely during harvesting operation, and thus the position of the cutter bar 64 relative to the ground is controlled during harvesting solely by the position of the gauge wheels 70 in the furrows of the field. This is an important feature in that during harvesting operation, the operator of the harvester 40 is unable to see the position of the cutter bar because of the density of the crop. By observing the position of the gauge wheels 79 which remain visible during harvesting, the operator is easily able to gauge the position of the cutter bar 64 relative to the ground.

The cutter bar 64 is adjusted so that the slidable upper blade 78 is oscillated at the slowest rate consonant with positive shearing action for typically obtaining field conditions. The slidable blade 78 will oscillate at about 150 cycles per minute. The maximum rate is about 300 cycles per minute, and would rarely be reached even under the most difficult field conditions. The slidable blade 78 travels about three and one quarter inches relative to the fixed blade in completing one full cycle of operation.

The blades 77 and 78 shear off the tomato plants just below the ground, and immediately thereafter, the severed plants, the loose tomatoes and the tomato-sized dirt clods are picked up by the pickup conveyor 86. The loose dirt, twigs, leaves, weeds, trash, etc., simply go over the cutter blade 64 and back to the ground beneath the conveyor 86. Such loose dirt as starts up the conveyor 86 falls to the ground between the spaced apart rods 87 of the pickup conveyor 86. The speed of the conveyor 86 is adjusted at the control console 46 by the operator to be about fifteen percent under ground speed of the harvester, which is as fast as field conditions permit.

At the rearward and upper end of the pickup conveyor 86 some loose tomatoes and substantially all of the tomato sized dirt clods fall onto the clod cross-conveyors 91 and 92 and are thence carried to the loose tomato and clod sorting conveyors 108 via the loose tomato side elevators 100. Small chaff and dirt falls through the spaced apart bars of the clod cross-conveyors 91 and 92 and elevators 100 and are thus separated from the loose tomatoes and larger dirt clods.

The spinner 90 position is set by the operator before harvesting to vary the width and position of the gap for differing field condition; and the spinner 90 automatically rotates rearwardly at a speed about 15 percent faster than the forward pickup conveyor 86 travels. Thus, the spinner smoothly transfers the tomato plants off of the pickup conveyor 86 and lifts them onto the upwardly and rearwardly moving upper elevator conveyor 110.

The upper elevator conveyor belt 110 automatically travels at a speed about 15 percent faster than the spinner 90 which helps to transfer the tomato plants smoothly off of the spinner 90 and upwardly, so that the plants do not become entwined or jammed around the spinner 90. In this regard the spaced plural elastomeric projections 112 extending from the belt 110 materially enhance the engagement of the tomato plants by the belt 110.

After carrying the tomato-laden plants upward the upper elevator conveyor belt 110 deposits them onto the forward ends of the walking bars 120 and 121 of the shaker assembly 53. As the plants are carried along the tops of the bars 120, 121 by the action of the horizontal fingers 128, the inverted vee projections 126 penetrate up into the plants and transmit an increasingly vigorous shaking agitation thereto. Ultimately, the exhausted plants are walked off the rearward ends of the bars 120, 121 and fall to the ground behind the harvester 40.

Meanwhile, the tomatoes freed by the agitation drop to the main tomato recovery conveyor 125. Some of the chaff and leaves, etc., that are also freed by the movement of the bars 120, 121 fall between the spaced apart rods of the recovery conveyor 125 and are thereby separated from the recovered tomatoes. The tomatoes then pass to the rear cross-conveyor and chaff removal assembly 54 where air streams remove further chaff, while the cross-conveyor belts 130 and 131 move the recovered tomatoes outwardly to the sides of the harvester 40.

The recovered tomatoes are lowered by the transition conveyor assemblies 55 and 56 onto the main sorting conveyors 150 and 151 in an evenly distributed fashion, whereas any remaining small chaff, leaves, twigs, dirt, trash, and other foreign matter, can fall to the ground between the slowly rotating cylinders 140, 141, 142, and 143.

About eight farm laborers stand on each sorter platform 152, 153 and face the sorting conveyors 150 and 151. Unacceptable tomatoes and any extraneous matter on the conveyors 150 and 151 are removed by the laborers, leaving sorted tomatoes on the conveyors 150 and 151. Two or more of the laborers are positioned above and in front of the other sorters as they stand on the inset platform 151 and select good tomatoes from the loose tomato conveyors 108 and place them onto the main sorting conveyors 150 and 151. The unacceptable loose tomatoes and dirt clods fall of conveyors 108 to the ground. The tomatoes remaining on the main sorting conveyors 150 and 151 are passed to the transverse loading conveyor assembly 156 and are thence transported to an awaiting tomato bin on a flat bed truck (not shown) traveling adjacent to and synchronous with the harvester.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A tomato harvester of the type having a main frame having a central longitudinal axis, pickup and elevating means supported by said main frame for severing tomato plants below ground and elevating them and for depositing them within said main frame, separating means supported by said main frame for receiving said deposited tomato plants from said pickup and elevating means and for separating ripe tomatoes from the plants, collecting means supported by said main frame below said separating means for collecting the separated tomatoes and moving them rearwardly, and a pair of sorting stations supported by said main frame, one at each side of said harvester each including a main forwardly moving sorting conveyor supported by main frame to receive the collected separated tomatoes from said collecting means the combination characterized by:

said pickup and elevating means comprising a forward inclined pickup, having an upper end to the rear of a forward lower end, and a rearward relatively more sharply inclined elevator in line with said pickup and having a lower end, separated from said upper end of said forward pickup to define a gap therebetween, said elevator having a conveyor, said forward pickup having a frame, plant stem severing means at the forward lower end of said frame and a pickup and elevating conveyor with its forward end spaced back of said severing means at a distance just sufficient to enable most of the loose dirt raised in a ground swell when said severing means is in operating position below ground surface to return to the ground surface below said forward end of said pickup and elevating conveyor even when that forward end is only slightly above ground level, said pickup and elevating conveyor comprising a series of edge-interlocked bars having central conveying portions spaced apart far enough to let loose dirt drop through and close enough together to retain loose tomatoes thereon and consequently to retain thereon dirt clods of tomato size and larger, rotatable spinner means supported by said main frame in said gap between said lower end of said elevator and said upper end of said forward pickup for assisting transfer of picked up tomato plants onto said elevator while enabling picked up loose tomatoes and clods to fall downwardly through said gap said gap being wide enough to enable said clods and loose tomatoes to drop therethrough and to accommodate said rotatable spinner means, a pair of clod cross-conveyors supported by said main frame and having front transverse edges underlying and generally aligned with said upper end of said forward pickup and having rear transverse edges underlying and generally aligned with said lower end of said elevator so that cross-conveyors are below said gap and operable for moving separated clods and tomatoes outwardly from said central longitudinal axis, a pair of clod elevators each supported by said main frame at the outer end of a said clod cross-conveyor and operable for receiving clods and loose tomatoes thereon and for elevating them, and a pair of rearwardly moving clod conveyors supported by said main frame, each being parallel to, adjacent to and above and displaced inwardly toward said central axis from a said main sorting conveyor and having a front end positioned to receive clods and loose tomatoes from a said clod elevator and having a rear discharge end for dropping clods and culls onto the ground, said sorting stations each having clod conveyor access platform means located at a higher level than the remainder of said sorting station and at least partially inwardly therefrom closer to said central axis for positioning at least one sorter of each said sorting station within reach of his said clod conveyor and the said adjacent main sorting conveyor, whereby said sorter is able conveniently to transfer good tomatoes from his said clod conveyor to his said main sorting conveyor while those two conveyors are moving countercurrently.

2. The harvester of claim 1 wherein said spinner means is a rotating spinner assembly of plural, axially parallel, radially extending bars, each bar being resilient and having an undulating outer edge, and means for supporting said spinner assembly by said frame in any one of a plurality of positions relative to said pickup and said elevator, according to harvesting conditions, to engage said severed tomato vines, said spinner assembly being rotated in a direction so that its top surface moves generally rearwardly to move said vines across said gap and to urge them into engagement with said elevator while said loose tomatoes and dirt clods fall to said clod cross-conveyors.

3. The harvester of claim 2 having self propelling means for moving said harvester at selected ground speeds and including first power means supported by said main frame and connected to said pickup and elevating conveyor for moving said pickup and elevating conveyor rearwardly at a speed approximately fifteen percent below the ground speed of said harvester, second power means supported by said main frame and connected to said spinner assembly for rotating said spinner assembly so that the top surface thereof moves generally rearwardly at a speed approximating the ground speed of said harvester, and third power means supported by said main frame and connected to said elevator conveyor for moving said elevator conveyor rearwardly and upwardly at a speed approximately fifteen percent above the ground speed of said harvester.

4. The harvester of claim 1 wherein said pickup and elevating conveyor is inclined at an angle of about twenty degrees relative to the horizontal and includes power means for causing it to travel rearwardly at a speed about fifteen percent slower than the ground speed of said harvester.

5. The harvester of claim 4 wherein the upper elevator conveyor is inclined to the horizontal at an angle of about forty degrees and travels upwardly at a speed of about thirty percent faster than the speed of said pickup and elevating conveyor.

6. The harvester of claim 1 wherein said plant stem severing means comprises a cutter bar having a fixed sawtoothed blade and an oscillating sawtoothed blade in overlying engagement with said fixed blade.

7. The harvester of claim 6 wherein said frame of said forward pickup is pivotally mounted to a front portion of said main frame and plural castor wheels pivotally mounted at the front of said forward pickup frame to support said pickup frame.

8. The harvester of claim 6 including power means supported by said forward pickup frame and connected to said cutter bar for oscillating said cutter bar at a rate between 150 and 300 cycles per minute.

9. The harvester of claim 1 wherein said clod cross-conveyors each comprise an endless conveyor of spaced-apart end-linked rods enabling broken clods to pass between successive rods and fall to the ground surface.

10. The harvester of claim 1 having rear cross-conveyor means supported by said main frame and extending transversely outwardly between said collecting means and each said main sorter conveyor for transferring the collected fruit from said collecting means to each main sorter conveyor, said cross-conveyor means including two lateral oppositely and axially outwardly moving belts and two sets of plural parallel rollers wherein adjacent rollers are spaced apart somewhat less than an average tomato diameter and mechanically linked together to rotate synchronously in an outward direction, each said set immediately adjacent and lying between a said belt and the rear end of a said main sorting conveyor.

11. The harvester of claim 10 wherein said belts are substantially higher than said main sorting conveyors and said rollers of each set are successively lower from the innermost to the outmost to define a down slope, the roller closest to each said belt being the highest but being lower than said belt, the roller closest to said main sorting conveyor being the lowest but being higher than said main sorting conveyor.

12. The harvester of claim 1 wherein said elevator conveyor comprises an endless imperforate belt having multiple spaced apart resilient fingers extending outwardly therefrom.

13. The harvester of claim 1 wherein said separating means comprises plural sets of parallel spaced apart walking bars each having a resilient bumper mounted to the topside thereof, said bumper being in the shape of a series of upwardly extending acutely inclined inverted vee projections rounded at their upper ends and spaced apart at their bases by undulating portions of said bumper.

14. The harvester of claim 13 wherein said bumper additionally comprises a series of slender resilient horizontal fingers, each extending transversely from said bar at the base of each inverted vee projection.

15. The harvester of claim 13 including means for oscillating said walking bars at a rate of between 175 and 195 revolutions per minute.

16. The harvester of claim 1 wherein there are clod elevator securing means for securing said pair of clod elevators to said main frame and for enabling rapid removal of said pair of clod elevators from said main frame.

17. The harvester of claim 16 having spinner securing means securing said spinner means to said main frame and for enabling rapid removal of said spinner means from said main frame, and elevator repositioning means securing said elevator to said main frame for repositioning said elevator on said main frame after removal of said spinner means from said main frame so that the lower end of said elevator lies directly below the upperend of said pickup and elevating conveyor with some overlap, whereby said gap is eliminated.

* * * * *